United States Patent [19]
Usui et al.

[11] 3,762,495
[45] Oct. 2, 1973

[54] METHOD AND DEVICE FOR TRIGGERING MOTOR VEHICLE SAFETY MECHANISMS

[75] Inventors: Keizaburo Usui, Yokohama; Ken Ichi Mitsuhashi, Tokyo; Takashi Isome, Yokosuka, all of Japan

[73] Assignee: Nissan Motor Company Limited, Yokohama, Japan

[22] Filed: Apr. 15, 1971

[21] Appl. No.: 134,297

[30] Foreign Application Priority Data
July 4, 1970 Japan.................................. 45/58447

[52] U.S. Cl............ 180/103, 280/150 AB, 324/162
[51] Int. Cl............................................ B60r 21/10
[58] Field of Search............... 280/150 AB; 180/103, 180/82; 340/52 R, 52 H, 262; 200/61.45; 324/162; 303/21 BE

[56] References Cited
UNITED STATES PATENTS

| | | |
|---|---|---|
| 3,622,974 | 11/1971 | Best et al...................... 280/150 AB |
| 3,574,417 | 4/1971 | Howard et al.................. 303/21 BE |
| 3,640,589 | 2/1972 | Taniguchi....................... 303/21 BE |
| 3,620,576 | 11/1971 | Wehde............................ 303/21 BE |
| 3,420,572 | 1/1969 | Bisland............................. 180/103 |

Primary Examiner—Kenneth H. Betts
Attorney—Robert E. Burns and Emmanuel J. Lobato

[57] ABSTRACT

A method and a device for triggering a motor vehicle safety device, such as an inflatable safety bag or a burstable safety netting when the motor vehicle collides with another object. The impact between the motor vehicle and the other object is detected and a triggering signal is supplied to the safety device in accordance with both the magnitude of deceleration resulting from the impact and the rate of the deceleration. The nature of the collision can be monitored by the grade of the linear of the magnitude of the deceleration at an initial stage of the impact so that the safety device can be actuated to its protective position in the event of any collisions such as the vehicle-to-barrier and vehicle-to-vehicle collisions.

8 Claims, 3 Drawing Figures

METHOD AND DEVICE FOR TRIGGERING MOTOR VEHICLE SAFETY MECHANISMS

This invention relates to vehicular safety devices of the type which is adapted to protect a vehicle occupant from injury otherwise resulting from a collision of the motor vehicle. The invention more particularly relates to a method and a device for supplying a triggering signal to the vehicular safety device immediately when an impact resulting from a collision is detected so that the safety device can operate reliably and instantaneously. The safety devices to which this invention is directed include impact absorbing devices using an inflatable safety bag or a burstable safety netting which are actuated into their protective positions when the motor vehicle is subjected to a sudden impact during cruising.

The vehicular safety device of the described type is usually provided with means by which the safety device is actuated or triggered into its protective position when an impact exceeding a predetermined magnitude is detected by such means. The magnitude of the impact is converted into a mechanical signal, which is transmitted to an actuating unit of the safety device so that the safety device can respond to such impact.

It is known that the magnitude and rate of a deceleration resulting from a collision of a motor vehicle vary from a vehicle-to-barrier collision to vehicle-to-vehicle collision. In the vehicle-to-vehicle collision especially with the side structure of another vehicle, the magnitude of the deceleration is far smaller than that in the vehicle-to-barrier collision. The vehicle occupant, on the other hand, is exposed to danger of colliding against structural parts of the motor vehicle due to an inertia resulting from the collision of the vehicle with less respect to the magnitude and rate of the deceleration. The impact to which the occupant is subjected varies according to the driving speed of the vehicle at the very moment of the collision and, if the vehicle collides against another vehicle while it is driven at an elevated speed, the occupant will suffer serious injury even though the vehicle collides against the side structure of the other vehicle. (The collision of the vehicle against the side structure of another vehicle is hereinafter referred to as "sidewise vehicle-to-vehicle collision.")

The impact resulting from the sidewise vehicle-to-vehicle collision can not be responded to satisfactorily in the conventional impact detector which is usually arranged in a manner to be triggered when the magnitude of the deceleration reaches a predetermined level. If such detector is arranged so as to respond to a lower decelerating magnitude, then the safety device would be triggered even in the event of a collision at relatively low vehicle speed in which the occupant is not liable to be hurt. Actuation of the safety device during such collision will only contribute to placing an unintended obstacle in the driver's frontal viewing, incurring an otherwise avoidable danger on the vehicle occupant.

An object of this invention is therefore to prevent such objectionable actuation of the safety device as in the event of a sidewise vehicle-to-vehicle collision.

Another object of the invention is to provide a method and a device which are adapted to reliably trigger the safety device when, and only when, a motor vehicle encounters an impact likely to cause crucial damage to the vehicle and to the vehicle occupant.

Still another object of the invention is to provide a method and a device for triggering the safety device with less respect to the magnitude of the deceleration of the motor vehicle during a collision.

To achieve these and other objects of this invention, a signal voltage is first produced which is substantially proportional to the magnitude of deceleration of the motor vehicle as detected at an initial stage of the impact. This signal voltage is differentiated in terms of time thereby to produce a signal voltage representing a rate of deceleration resulting from the impact at the initial stage thereof. A triggering signal for actuating the safety device into its protective position is then produced when the differentiated signal voltage is in a range corresponding to a predetermined range of decelerating rate and when the initial signal voltages reaches a predetermined level corresponding to a decelerating magnitude which is predetermined in respect of the aforesaid predetermined decelerating rate.

More specifically, the signal voltage initially produced through detection of the magnitude of deceleration is compared with a set of reference voltages representing different predetermined decelerating magnitudes, thereby producing a signal voltage which is representative of any of the predetermined decelerating magnitudes when the input signal voltage is higher than the reference voltage representing the particular decelerating magnitude. The initial signal voltage is, on the other hand, differentiated in terms of time for producing a signal voltage which is in-dicative of a rate of the deceleration at the initial stage of the impact. This signal voltage is coupled with another set of reference voltages representing different predetermined decelerating rates and corresponding respectively to the first set of the reference voltages, so as to produce a signal voltage representative of any of the decelerating rates when the former signal voltage is lower than the reference voltage representing the particular decelerating rate. The two signal voltages thus representing the selected predetermined deceleration magnitude and rate are coupled together so that an output voltage is produces when, and only when, the two signal voltages are produced coincidently. The signal voltage representing the rate of the deceleration detected is also compared with a reference voltage which is lower than the second set of reference voltages and which is indicative of a predetermined decelerating rate lower than the lowest one of the aforesaid predetermined decelerating rates. A signal voltage is thus produced when the input signal voltage is higher than this reference voltage. The resultant signal voltage is coupled with the signal voltage produced when the two signal voltages representing the selected predetermined decelerating magnitude and rate are produced concurrently, producing a signal voltage when the signal voltages to be coupled together are produced coincidently. The highest of the first and second sets of the reference voltages may correspond to the magnitude and rate, respectively, of a deceleration at an initial stage of the impact resulting from a vehicle-to-barrier collision while the last reference signal may correspond to the magnitude of a deceleration resulting from a sidewise vehicle-to-vehicle collision. If preferred, high-frequency noises contained in the initially produced signal voltage corresponding to the detected magnitude of the deceleration magnitude may be removed therefrom through use of a low-pass filter.

It should be understood that, although the method and device according to this invention are herein described as used mainly for a safety device of a motor vehicle, such will find extensive applications where a mechanical impact in general is to be responded to at its initial stage.

Figure 1:
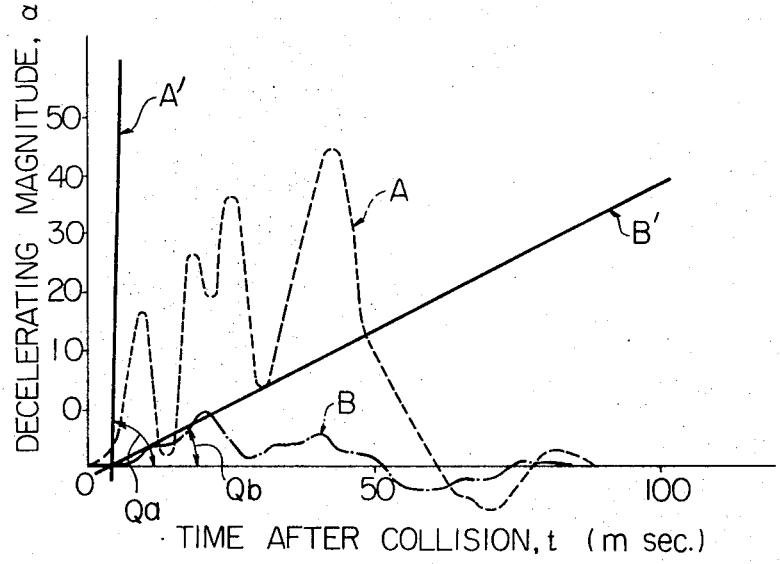
FIG. 1 is a graphic representation of representative examples of the variation of the deceleration magnitude $\alpha$ in terms of time $t$ in milli-seconds as observed during vehicle-to-barrier and sidewise vehicle-to-vehicle collisions.
Figure 2:
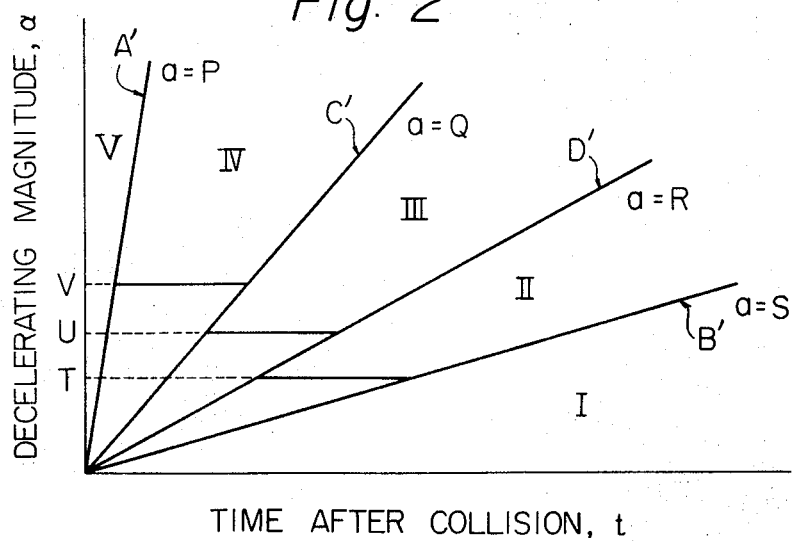
FIG. 2 is a graphic representation of the operational concept of the method and device according to this invention.

Reference is first made to FIG. 1, wherein curve A in a broken line indicates an example of a variation of a decelerating magnitude during a vehicle-to-barrier collision encountered when the motor vehicle is driven at a speed of about 50 km/hr., and curve B in a dot-and-dash line indicates an example of a variation of a decelerating magnitude caused by a sidewise vehicle-to-vehicle collision. It is observed in FIG. 1 that the deceleration magnitude $\alpha$ is far lower in a sidewise vehicle-to-vehicle collision than in a vehicle-to-barrier collision and that the decelerating magnitude in any collision rises substantially linearly at an initial stage of the collision. Thus, this invention proposes to utilize such linear variation of the decelerating magnitude at the initial stage of the collision. For this purpose, the decelerating magnitude is differentiated in terms of time so as to derive a decelerating rate $a$ which, in FIG. 1, is represented by the grade $Q_a$ or $Q_b$ of an extension A' of the initial portion of the curve A or B, respectively. The decelerating rate is substantially indicative of the specific nature of the collision encountered and is applicable for discriminating a vehicle-to-barrier collision from a sidewise vehicle-to-vehicle collision and vice versa. According to this invention, a range between the two decelerating rates is divided into a plurality of sub-ranges for providing reliable and pertinent actuation of the safety device, and example being illustrated in FIG. 2. In FIG. 2, a range of the decelerating rate lower than the predetermined decelerating rate corresponding to line B' in FIG. 1 is referred to as range I. Now, the range between the lines A' and B' corresponding to the counterparts of FIG. 1 is divided into three consecutive ranges II, III and IV which are separated by lines C' and D' which represent predetermined deceleration rates. A range of the decelerating rate higher than the level corresponding to line A' is indicated as range V. The decelerating rates corresponding to the lines A', B', C' and D' are herein assumed to be P, S, Q and R, respectively, where P>Q>R>S. Predetermined deceleration magnitudes T, U and V are allocated to ranges II, III and IV, respectively, where T<U<V.

In the method according to this invention, the safety device is kept inoperative when the decelerating rate remains in ranges I and V and, when the decelerating rate reaches any of the ranges II, III and IV and when the decelerating magnitude reaches any of the levels T, U and V corresponding to the respective decelerating rates, then a triggering signal is applied to the safety device, which is consequently actuated to its protective position instantaneously.

It should be understood in this instance that, although the range defined by the highest and lowest decelerating rates as corresponding to the upper and lower limits A' and B', respectively, is divided into three ranges II, III and IV as shown in FIG. 2, such may be divided into any number of sub-ranges where situations call for.

It is now apparent from the foregoing description that the method and device according to this invention rely upon a basic concept in which the decelerating magnitude increases substantially linearly at an inertial stage of the impact and as such can be expressed generally as $\alpha = a \cdot t$. The safety device is triggered when, and only when, a predetermined relationship between the values $\alpha$ and $a$ is established.

Figure 3:
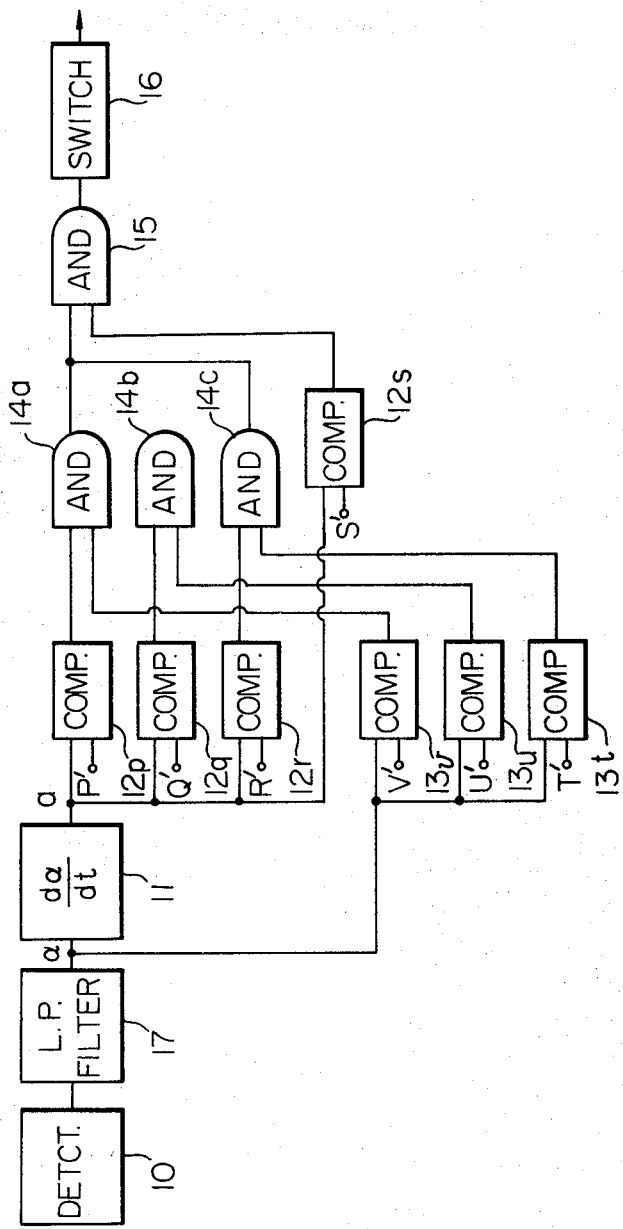
FIG. 3 is a block diagram showing an electrical arrangement of the device according to this invention.

A preferred embodiment of an arrangement adapted for realizing such basic concept is illustrated in FIG. 3 in a diagrammatic form.

Referring to FIG. 3, reference numeral 10 designates means for detecting a magnitude of deceleration resulting from an impact to which a motor vehicle having a safety device is subjected. The means 11 produces a signal voltage which is substantially proportional to the magnitude of the deceleration detected. The means 10 is connected to differentiating means 11 whereby the signal voltage representing the detected megnitude of deceleration is differentiated in terms of time so as to deliver an output signal voltage which is indicative of the rate of the deceleration detected. The differentiating means 11 is connected to a plurality comprising comparing means or comparators which are herein shown as four in number as indicated by reference numerals $12p$, $12q$, $12r$ and $12s$. Reference voltages P', Q', R' and S' are constantly supplied to the comparators $12p$, $12q$, $12r$ and $12s$, respectively. These reference voltages P', Q', R' and S' correspond respectively to the predetermined decelerating rates P, Q, R and S mentioned previously, where $P' > Q' > R' > S'$. The signal voltage supplied from the differentiating means 11 is compared with these reference voltages P', Q', R' and S'. Each of the comparators $12p$, $12q$ and $12r$ produces its output voltage when the input voltage is lower than its specific reference voltage. The comparator $12s$, on the other hand, produces an output voltage when the input voltage is higher than its reference voltage S'.

The detecting means 10 is also connected to a plurality of comparing means $13t$, $13u$ and $13v$ which are respectively associated with the comparators $12p$, $12q$ and $12r$. These comparators $13t$, $13u$ and $13v$ constantly receive reference voltages T', U' and V', respectively, which are related to the predetermined decelerating magnitudes T, U and V, respectively, where $T' < U' < V'$. Each of the comparators $13t$, $13u$ and $13v$ produces an output voltage when the input voltage is higher than the reference voltage assigned thereto.

Thus, the comparator $12p$ to $13v$ produce their output voltages under the following conditions:

Comparator $12p$: $a < P'$
Comparator $12q$: $a < Q'$
Comparator $12r$: $a < R'$
Comparator $12s$: $a > S'$
Comparator $13t$: $a > T'$
Comparator $13u$: $a > U'$
Comparator $13v$: $a > V'$ The comparators $12p$ to $13v$ are connected to AND-gating means which is shown as made up of the AND gates $14a$, $14b$ and $14c$. The AND gate $14a$ is connected to the comparators $12p$ and $13v$, the AND gate $14b$ to the comparators $12q$ and $13u$ and the AND gate 14c to the comparators 12r and 13t. Each of the AND gates 14a, 14b and 14c produces and output voltage when both of the two input signals are coincidently supplied thereto. The AND gates 14a, 14b and 14c and the comparator 12s are connected to an AND gate 15 so that, when an output voltage is produced from any of the AND gates 14a, 14b and 14c and from the comparator 12s concurrently, then the AND gate 15 produces an output voltage. This output voltage is used to provide a triggering signal for actuating the safety device with which the shown electrical arrangement is associated. For this purpose, the AND gate 15 may be connected to a suitable switching means 16 which is normally kept open and which is closed when receiving a signal voltage from the AND gate 15.

In order to have high-frequency noises removed from the signal voltage supplied from the detecting means 10, a low-pass filter 17 may be connected between the detecting means 10 and the differentiating means 11 and the comparators 13t, 13u and 13v, as illustrated.

When, now, a motor vehicle equipped with a safety device which is actuated by the triggering arrangement shown in FIG. 3 encounters a collision during operation, then the detecting means 10 detects the magnitude of deceleration resulting from the impact caused by the collision at an initial stage of the impact and produces a signal voltage representing the magnitude of the deceleration.

The signal voltage thus produced is supplied to the differentiating means 11 and concurrently to the comparators 13t, 13u and 13v. The signal voltage received by the differentiating means 11 is thereby converted into a signal voltage representing the rate $a$ of the deceleration. The output signal from the differentiating means 11 is supplied to the comparators 12p, 12q, 12r and 12s and compared with the reference voltages P', Q', R' and S', respectively. The signal voltage supplied from the detecting means 10 to the comparators 13t, 13u, and 13v are compared with the reference voltages T', U' and V', respectively.

Now, if $a < S'$, then the comparators 12p, 12q and 12r produce output voltages which are supplied to the AND gates 14a, 14b and 14c, respectively. Since, however, the comparator 12s is disabled to produce an output voltage, the AND gate remains inoperative even though any of the comparators 13t, 13u and 13v produces an output voltage to permit any of the AND gates 14a, 14b and 14c to produce an output voltage. This condition corresponds to range I in FIG. 2.

If the rate of deceleration is higher and hence $S' \leq a < R'$ to provide range II of the decelerating unit, the comparators 12p, 12q, 12r and 12s produce output voltages. When, in this instance, the magnitude of the deceleration detected exceeds the level T, viz., the signal voltage from the detecting means 10 exceeds the reference voltage T', then an output voltage is produced from the comparator 13t so that the AND gate 14c is permitted to produce an output voltage. With the comparator 12s operative, the AND gate 15 produces an output voltage so as to cause the safety device to be triggered by a triggering signal which may be supplied from the switching means 16.

In range III of the decelerating rate in which $R' \leq a < Q'$, the comparators 12p, 12q and 12s produce output voltages which the comparator 12r inoperative so that the AND gates 14a and 14b receive input voltages from the comparators 12p and 12q and the AND gate 15 receives an input voltage from the comparator 12s. If, therefore, the signal voltage supplied to the comparators 13t, 13u and 13v is higher than the reference voltage U' in the comparator 13u, the AND gate 14b receives an input voltage not only from the comparator 12q but from the comparator 13u and is consequently permitted to pass its output voltage to the AND gate 15. The AND gate 15 produces an output voltage to cause the safety device to be triggered.

If, furthermore, $Q' \geq a > P'$ providing range IV of the decelerating rate, the comparators 12p and 12s produce output voltages whilst the comparators 12p and 12r remain inoperative. When the signal voltage supplied to the comparators 13t, 13u and 13v exceeds the reference voltage V' in the comparator 13v, the AND gate 14a is permitted to supply an output voltage to the AND gate 15. With the comparator 12s operative, the AND gate 15 produces an output voltage to actuate the safety device into its protective condition.

If, lastly, $a \geq P'$ so that the decelerating rate falls in range V in FIG. 2, the comparators 12p, 12q and 12r are disabled to produce output voltages while the comparator 12s is permitted to produce an output voltage. An output voltage is not produced from any of the AND gates 14a, 14b and 14c whereby the AND gate remains inoperative to keep the safety device at rest.

The various conditions of the individual comparators and AND gates are tabulated in the following table.

|     | $a < S'$ | $S' \leq a < R'$ | $R' \leq a < Q'$ | $Q' \leq a < P'$ | $a > P'$ |
| --- | --- | --- | --- | --- | --- |
| 12p | ON | ON | ON | ON | OFF |
| 12q | ON | ON | ON | OFF | OFF |
| 12r | ON | ON | OFF | OFF | OFF |
| 13v | ON | ON | ON | ON | ON |
| 13u | ON | ON | ON | ON | ON |
| 13t | ON | ON | ON | ON | ON |
| 14a | ON | ON | ON | ON | OFF |
| 14b | ON | ON | ON | OFF | OFF |
| 14c | ON | ON | OFF | OFF | OFF |
| 12s | OFF | ON | ON | ON | ON |
| 15  | OFF | ON | ON | ON | OFF |

Note: The comparators 13t, 13u and 13v are assumed in the above table to be supplied with an input voltage higher than their respective reference voltage T', U' and V'.

What is claimed is:

1. In a motor vehicle equipped with a safety device triggerable into a protective position in response to a trigger signal produced during an impact the motor vehicle and another object, a method for producing a triggering signal and supplying same to said safety device comprising: detecting the magnitude of deceleration resulting from an impact between the motor vehicle and another object at an initial stage of the impact, producing a first signal voltage substantially proportional to said magnitude of the deceleration, comparing said first signal voltage with a first set of reference voltages representing different predetermined decelerating magnitudes and producing a second signal voltage representing any of said predetermined decelerating magnitudes when said first signal voltage is higher than the reference voltage representing said any of the predetermined decelerating magnitudes, differentiating said first signal voltage with respect to time for producing a third signal voltage substantially proportional to the rate of the deceleration at said initial stage of the impact, comparing said third signal voltage with a second set of reference voltages representing different predetermined decelerating rates and related respectively to said predetermined decelerating magnitudes and producing a fourth signal voltage representing any of said predetermined decelerating rates when said third signal voltage is lower than the reference voltage representing said any of the predetermined decelerating rates, coupling said second and fourth signal voltages for producing a fifth signal voltage when the second and fourth signal voltages are produced coincidently, comparing said third signal voltage with a reference voltage lower than said second set of the reference voltages and producing a sixth signal voltage when said third signal voltage is higher than said reference voltage coupling said sixth reference voltage with said fifth signal voltage for producing a seventh signal voltage when said fifth and sixth signal voltages are produced coincidently, and supplying said seventh signal voltage as a triggering signal to said safety device for triggering said safety device into its protective position.

2. A method according to claim 1, wherein the highest of said first and second sets of the reference voltages corresponds substantially to a magnitude and a rate, respectively, of the deceleration at an initial stage of the impact resulting from a vehicle-to-barrier collision and said reference voltage corresponds substantially to a rate of the deceleration at an initial stage of the impact resulting from a sidewise vehicle-to-vehicle collision.

3. A method according to claim 1, further comprising removing high-frequency noises from said first signal voltage.

4. A method for supplying a triggering signal related to specified magnitude and rate of a deceleration resulting from a mechanical impact, comprising detecting a magnitude of deceleration at an initial stage of said impact, producing a first signal voltage proportional to said magnitude of the deceleration, comparing said first signal voltage with a first set of reference voltages representing different predetermined decelerating magnitudes for producing a second signal voltage representing any of said decelerating magnitudes when said first signal is higher than any of said reference voltages, differentiating said first signal voltage for producing a third signal voltage representing the rate of said deceleration detected at said initial stage of the impact, comparing said third signal voltage with a second set of reference voltages related respectively to said deceleration magnitudes and representing different predetermined decelerating rates for producing a fourth signal voltage representing any of said decelerating rates when said third signal voltage is lower than any of said second set of the reference voltages, coupling said second and fourth signal voltages together for producing a fifth signal voltage when said second and fourth signal voltages are produced coincidently, comparing said third signal voltage with a reference voltage lower than said second set of reference voltages for producing a sixth signal voltage when said third signal voltage is higher than said reference voltage, and coupling said fifth and sixth signal voltages together for producing a seventh signal voltage when the fifth and sixth signal voltages are produced coincidently, said seventh signal voltage providing said triggering signal.

5. In combination: a safety device of a motor vehicle triggerable into a protective position in response to a trigger signal produced as a result of an impact between the motor vehicle and another object, means for detecting the magnitude of deceleration resulting from an impact at an initial stage of the impact and producing a signal voltage proportional to said magnitude of the deceleration, first comparing means connected to the detecting means for comparing said signal voltage when a set of reference voltages representing different predetermined decelerating magnitudes and producing an output voltage representative of any of said decelerating magnitudes when said signal voltage is higher than any of said reference voltages, differentiating means connected to said detecting means in parallel with said first comparing means for differentiating said signal voltage with respect to time and producing an output voltage representing a rate of the deceleration detected at said initial stage of said impact, second comparing means connected to said differentiating means for comparing said output voltage from said differentiating means with a set of reference voltages related to said decelerating magnitudes and representing different predetermined decelerating rates and producing an output voltage representative of any of said decelerating rates when said output voltage from said differentiating means is lower than any of said reference voltages in said second comparing means and producing an output voltage when said output voltage from said differentiating means is higher than said reference voltage, and second AND gating means connected to said first AND gating means and said third comparing means for producing an output voltage when receiving the output voltages coincidently from first AND-gating means and said third comparing means and supplying said output voltage as a trigger signal to said safety device for triggering the same.

6. A combination according to claim 5, wherein the highest of said reference voltages in said first and second comparing means corresponds substantially to a magnitude and a rate, respectively, of the deceleration at an initial stage of the impact resulting from a vehicle-to-barrier collision and said reference voltage in said third comparing means corresponds substantially to a rate of the deceleration at an initial stage of the impact resulting from a vehicle-to-behicle collision.

7. A combination according to claim 5, wherein a lowpass filter is connected between said detecting means and said differentiating and first comparing means for removing high-frequency noises from said signal voltage.

8. In a motor vehicle equipped with a safety device triggerable into a protective position in response to a trigger signal produced during an impact between the motor vehicle and another object, a method for producing a triggering signal and applying same to said safety device comprising: detecting the magnitude of deceleration resulting from an impact at an initial stage of said impact, producing a first signal voltage substantially proportional to said magnitude or deceleration, producing a second signal voltage when said first signal voltage reaches a level corresponding to a predetermined deceleration magnitude which is determined in relation to a predetermined range of decelerating rates, differentiating said first signal voltage with respect to time to produce a third signal voltage representing the rate of the deceleration resulting from said impact at the initial stage of the impact, producing a fourth signal voltage when said third signal voltage is in a range within said predetermined range of decelerating rates, producing a triggering signal when said second and fourth signal voltages coincidently exist, and applying said triggering signal to said safety device to trigger said safety device into its protective position.

* * * * *